United States Patent
Maor

(10) Patent No.: US 9,865,106 B2
(45) Date of Patent: Jan. 9, 2018

(54) WIRELESS PROTOCOL MESSAGE CONVERSION DEVICE AND METHODS OF USING THEREOF

(71) Applicant: Wise-Sec Ltd., Yokneam (IL)

(72) Inventor: Vadim Maor, Kiryat-Tivon (IL)

(73) Assignee: Wise-Sec Ltd., Yokneam (IL)

( * ) Notice: Subject to any disclaimer, the term of this patent is extended or adjusted under 35 U.S.C. 154(b) by 0 days.

(21) Appl. No.: 15/030,060

(22) PCT Filed: Oct. 12, 2014

(86) PCT No.: PCT/IL2014/050896
§ 371 (c)(1),
(2) Date: Apr. 17, 2016

(87) PCT Pub. No.: WO2015/056263
PCT Pub. Date: Apr. 23, 2015

(65) Prior Publication Data
US 2016/0247338 A1    Aug. 25, 2016

Related U.S. Application Data

(60) Provisional application No. 61/891,964, filed on Oct. 17, 2013.

(51) Int. Cl.
*G07C 9/00* (2006.01)
*H04W 88/16* (2009.01)
(Continued)

(52) U.S. Cl.
CPC ......... *G07C 9/00111* (2013.01); *H04W 4/008* (2013.01); *H04W 88/16* (2013.01); *H04W 84/12* (2013.01)

(58) Field of Classification Search
CPC ... G05B 1/01; G06K 5/00; G06K 7/10; G06K 7/0008; G07C 9/00111; H04W 4/008; H04W 88/16; H04W 84/12
(Continued)

(56) References Cited

U.S. PATENT DOCUMENTS

| | | | |
|---|---|---|---|
| 8,127,984 B2 * | 3/2012 | Zatloukal | G06K 7/0008 |
| | | | 235/375 |
| 2006/0118622 A1 | 6/2006 | Zatloukal et al. | |

(Continued)

FOREIGN PATENT DOCUMENTS

| | | |
|---|---|---|
| CN | 203455846 | 2/2014 |
| CN | 203590222 | 5/2014 |

(Continued)

OTHER PUBLICATIONS

International Preliminary Report on Patentability Dated Apr. 28, 2016 From the International Bureau of WIPO Re. Application No. PCT/IL2014/050896.

(Continued)

*Primary Examiner* — Ali Neyzari

(57) ABSTRACT

A method of wireless forwarding of service related content in a communication session. The method comprises providing a conversion circuit fixated in proximity to a service providing system and having a client side communication unit and a system side communication unit, intercepting, using the client side communication unit, a first wireless data message having service related content encoded according to a first communication protocol, generating, using the system side communication unit, a second wireless data message having the service related content encoded according to a second communication protocol, and transmitting, using the system side communication unit, the second wireless data message to the service providing system.

21 Claims, 5 Drawing Sheets

(51) Int. Cl.
*H04W 4/00* (2009.01)
*H04W 84/12* (2009.01)

(58) Field of Classification Search
USPC .......... 340/5.6, 5.61, 505, 539.1, 10.1, 10.3, 340/10.5
See application file for complete search history.

(56) References Cited

U.S. PATENT DOCUMENTS

| | | |
|---|---|---|
| 2008/0081631 A1 | 4/2008 | Rofougaran |
| 2009/0096575 A1 | 4/2009 | Tiernan |
| 2009/0170483 A1 | 7/2009 | Barnett et al. |
| 2010/0026454 A1 | 2/2010 | Rowse et al. |
| 2012/0256728 A1 | 10/2012 | Bajic et al. |
| 2013/0113609 A1 | 5/2013 | August et al. |

FOREIGN PATENT DOCUMENTS

| | | |
|---|---|---|
| EP | 2355368 | 8/2011 |
| EP | 3039794 | 7/2016 |
| WO | WO 2012/111999 | 8/2012 |
| WO | WO 2012/125897 | 9/2012 |
| WO | WO 2015/056263 | 4/2015 |

OTHER PUBLICATIONS

International Search Report and the Written Opinion Dated Jan. 26, 2015 From the International Searching Authority Re. Application No. PCT/IL2014/050896.

Search Report and Written Opinion Dated Jul. 27, 2016 From the Intellectual Property Office of Singapore Re. Application No. 11201602708T.

Ali et al. "Secure Mobile Communication in M-Payment System Using NFC Technology", 2012 International Conference on Informatics, Electronics & Vision, ICIEV, Dhaka, Bangladesh, May 18-19, 2012, p. 122-136, May 31, 2012.

Roland "Software Card Emulation in NFC-Enabled Mobile Phones: Great Advantage or Security Nightmare?", 4th International Workshop on Security and Privacy in Spontaneous Interaction and Mobile Phone Use, IWWSSI/SPMU, Newcastle, UK, Jun. 18, 2012, 6 P., Jun. 18, 2012. Section 3.

Supplementary European Search Report and the European Search Opinion Dated Apr. 19, 2017 From the European Patent Office Re. Application No. 14853733.5. (9 Pages).

Written Opinion Dated Jun. 5, 2017 From the Intellectual Property Office of Singapore Re. Application No. 11201602708T. (7 Pages).

* cited by examiner

WIRELESS PROTOCOL MESSAGE CONVERSION DEVICE AND METHODS OF USING THEREOF

RELATED APPLICATIONS

This application is a National Phase of PCT Patent Application No. PCT/IL2014/050896 having International filing date of Oct. 12, 2014, which claims the benefit of priority under 35 U.S.C. §119(e) of U.S. Provisional Patent Application No. 61/891,964 filed on Oct. 17, 2013. The contents of the above applications are all incorporated by reference as if fully set forth herein in their entirety.

BACKGROUND

The present invention, in some embodiments thereof, data conversion and, more specifically, but not exclusively, to methods and systems of wireless message conversion.

There are several wireless communication protocols to make a data transfer connection between two devices, for example a wireless local area network (WLAN) protocol, such as the IEEE 802.11 Standard, also known as Wi-Fi™, wireless personal area network (WPAN) protocol, such as the IEEE 802.15 Standard, also known as Bluetooth™, and IEEE 802.15.4 Standard, also known as ZigBee™. These protocols allow peer-to-peer direct connections between devices.

Another protocol that may be used for exchange of data between the portable device and the external device in short ranges, for example less than 20 centimeters (cm), is a near field communication (NFC) protocol. NFC uses magnetic field induction, where one loop antenna in one device comes sufficiently close to another loop antenna in another device, effectively forming an air-core transformer in which data is transferred between the two devices.

A protocol that may be used for wireless non-contact use of radio-frequency electromagnetic fields to transfer data, usually for the purposes of automatically identifying and tracking tags attached to objects, is Radio-frequency identification (RFID) protocol that define communication between tags and readers. RFID tags are used in many industries. An RFID tag attached to a product during production thereof, allowing tracking its progress through an assembly line. RFID tags are worn by personnel as a safety measure, allowing them to be located 24 hours a day and to be quickly found in emergencies. RFID tags are also for RFID Access Control. In such implementation, purchasers purchase a ticket or pass (e.g. transportation and/or entry ticket and/or pass) and receive an RFID card, which is usually about the size of a credit card. When a purchaser enters through an access point, a radio frequency gate that includes an RFID reader picks up a signal from the card without having the purchaser remove the RFID card from her pocket and/or hand. If the RFID card doesn't have a card or holds an invalid one, the gate does not open. If the RFID card has a valid ticket or pass, it will be automatically validated.

SUMMARY

According to an aspect of some embodiments of the present invention there is provided a method of wireless forwarding of service related content in a communication session. The method comprises providing a conversion circuit fixated in proximity to a service providing system and having a client side communication unit and a system side communication unit, intercepting, using the client side communication unit, a first wireless data message having service related content encoded according to a first communication protocol, generating, using the system side communication unit, a second wireless data message having the service related content encoded according to a second communication protocol, and transmitting, using the system side communication unit, the second wireless data message to the service providing system.

Optionally, the first wireless data message is originated from a handheld client terminal.

Optionally, the service providing system operates an electric gate according to the service related content.

Optionally, the system side communication unit comprises at least one of a near field communication (NFC) tag and a radio frequency identification (RFID) tag which performs the generating and the transmitting.

More optionally, the intercepting comprises:
decoding the service related content encoded from the first wireless data message, and storing the decoded service related content in a memory of the conversion circuit;
wherein the generating comprises:
using the system side communication unit to access the memory; and
using the system side communication unit to encode the decoded service related content according to the second communication protocol.

Optionally, the method further comprises receiving an interrogator signal from the service providing system at the system side communication unit and performing the generating and the transmitting in response to the interrogator signal.

Optionally, the service related content comprises a member of a group consisting of a unique identification (ID), an account number, a secret code, a credit balance, and electronic ticketing data.

Optionally, the first communication protocol is Bluetooth™ protocol and the second communication protocol is near field communication (NFC) protocol.

Optionally, the first communication protocol is Bluetooth™ protocol and the second communication protocol is radio frequency identification (RFID) protocol.

Optionally, the first communication protocol is wireless local area network (WLAN) protocol and the second communication protocol is selected from a group consisting of radio frequency identification (RFID) protocol and near field communication (NFC) protocol.

More optionally, the system side communication unit is at least one of a near field communication (NFC) tag and an radio frequency identification (RFID) tag; further comprising deactivating at least one of the NFC tag and the RFID tag; wherein the transmitting comprises injecting the service related content to a memory of the RFID tag and initializing the RFID tag to allow a wireless activation thereof by an RFID reader of the service providing system; wherein the transmitting is performed in response to the activation.

According to an aspect of some embodiments of the present invention there is provided a conversion system of wireless forwarding of service related content in a communication session. The system comprises a housing having a holding element for fixation in proximity to a service providing system, a client side communication unit which intercepts a first wireless data message having service related content encoded according to a first communication protocol, a system side communication unit, and a conversion integrated circuit (IC) which automatically generates, in response to intercepting the first wireless data message, a second wireless data message having the service related content encoded according to a second communication protocol and instructs the system side communication unit to transmit the second wireless data message immediately after receiving the first wireless data message.

Optionally, the conversion IC, the client side communication unit, and system side communication unit are powered independently from the service providing system.

Optionally, the conversion IC, the client side communication unit, and system side communication unit are not electrically connected to the service providing system.

Optionally, the conversion IC, the client side communication unit, and system side communication unit are not wired to the service providing system.

Optionally, the housing is external to the service providing system.

Optionally, the client side communication unit is a Bluetooth™ hardware module and the first communication protocol is Bluetooth™ protocol.

Optionally, the client side communication unit is a wireless local area network (WLAN) hardware module and the first communication protocol is a wireless local area network (WLAN) protocol.

Optionally, the housing mounts the transmitter to face a service providing system client side communication unit of a service providing system.

Optionally, the system side communication unit is at least one of a near field communication (NFC) tag and an radio frequency identification (RFID) tag; wherein the conversion integrated circuit automatically injects the service related content to a memory of at least one of the NFC tag and the RFID tag and initializes the RFID tag to allow a wireless activation thereof by at least one of an NFC reader and an RFID reader of the service providing system.

Optionally, housing having an upper panel and a lower panel which confines the client side communication unit, the conversion IC, and the system side communication unit and sized and shaped to cover a card reading area of the service providing system.

Optionally, the system further comprises a software client module installed in a handheld client terminal which adds the service related content to the first wireless data message; wherein the service related content is coordinated with an external management system.

More optionally, the service related content is a unique identifier (ID) indicative of entry card. Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
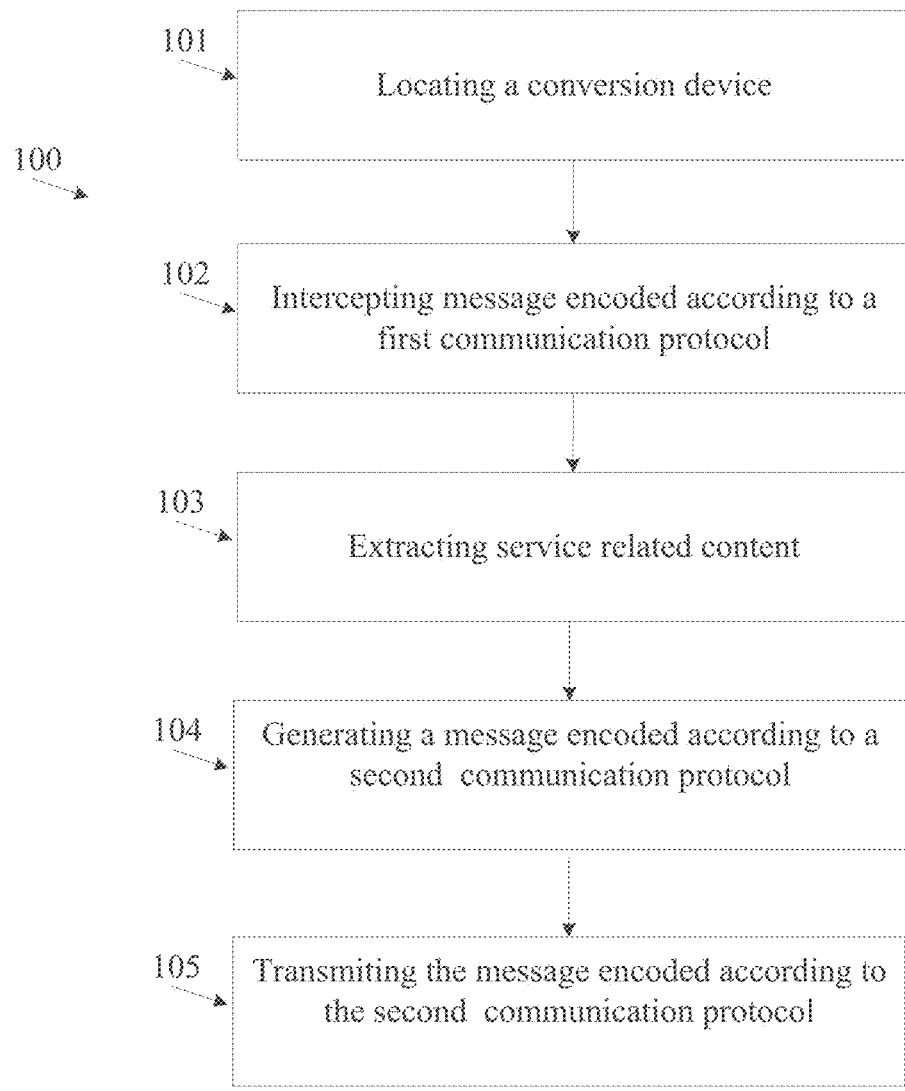
FIG. 1 is a flowchart 100 of a message conversion process, according to some embodiments of the present invention.

The present invention, in some embodiments thereof, data conversion and, more specifically, but not exclusively, to methods and systems of wireless message conversion.

According to some embodiments of the present invention, there are provided methods and systems of facilitating a service providing system to use an existing receiver that supports one communication protocol, such as an RFID and/or NFC reader, to receive wirelessly service related content extracted from messages (signals) encoded in another communication protocol such as Bluetooth and/or WLAN protocol.

In use, a conversion device that is optionally placed in proximity to service providing system, intercepts messages that include service related content encoded according to a certain communication protocol, and adds the service related content to a new message that is encoded according to another communication protocol. The conversion device may include RFID tag for transmitting the service related content that is extracted from an intercepted message. Such an RFID tag may also be used to wirelessly intercept messages from the service providing system, for example interrogator signals and/or requests.

The conversion device may include a Bluetooth and/or WLAN module for intercepting messages.

Optionally, the conversion device does not prevent from existing tags and/or cards to communicate with and receive service from the service providing system. For example the conversion device allows a service providing system that includes an electric gate, such as a turnstile, to operate the turnstile based on reading of service related content, such as balance and/or ID, from both existing cards and tags that communicate directly with the receiver of the service providing system and with client terminals and/or new cards and tags that communicate with the conversion device. In another example, the conversion device allows a service providing system such as a tag reader, for example RFID tag reader, to read service related content, such as tag or card ID, from both existing cards and tags that communicate directly with the receiver of the service providing system and with client terminals and/or new cards and tags that communicate with the conversion device.

Optionally, the conversion device is an add on device that is powered independently from the service providing system. Additionally or alternatively, the conversion device is not electrically connected to the service providing system. Additionally or alternatively, the conversion device is not wired to the service providing system. Additionally or alternatively, the electronic components of the conversion device and the electronic components of the service providing system are in separate housings.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart 100 of a message conversion process, according to some embodiments of the present invention. During the message conversion process a message that includes service related content encoded according to a first communication protocol, for example according to Bluetooth™ and/or WLAN protocol, such as wireless fidelity (Wi-Fi) protocol, is intercepted analyzed by an conversion device, for example a circuit, optionally independent of a service providing system, to generate a new message that includes the service related content encoded according to a second communication protocol, for example according to RFID and/or NFC protocol. The new message is transmitted to the service providing system by the conversion device, allowing the sender of the message which may be a client terminal or a tag, to communicate with the service providing system without transmitting messages encoded according to the second communication protocol.

For brevity, messages and signals may be used herein interchangeably.

For example, the service providing system may be an entry gate, such as a turnstile, an object reader, such as an RFID reader for reading RFID tags and the like. For brevity, a client terminal means a cellular device, a tablet, a Smartphone, a pair of smart glasses, and/or any other personal communication device.

Service related content may include an identifier, for instance a unique ID, payment and/or purchase instructions and/or confirmation, a ticket usage request, credentials, an image, decreasing and/or increasing account balance data, account update details, account number and/or identifier, a secret code, a money balance, eTicketing information, and a presence indication, a response to interrogator signal and/or the like.

The method is optionally implemented by a conversion device mounted in proximity to an existing receiver of an existing service providing system. In such a manner, for example as described below, the conversion device allows the service providing system to receive service related content from client terminals, such as cellular phones, and/or tags, which transmit service related content not encoded according to a communication protocol not supported by its existing receiver (or transceiver). This is performed by using the conversion device and optionally without amending, reprogramming, rewiring, and/or otherwise adapting the service providing system.

Figure 2B:
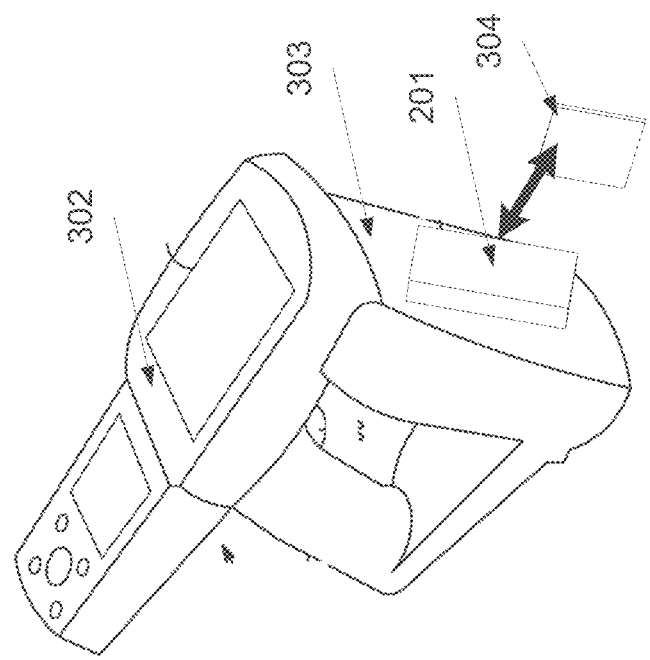
FIG. 2B is an exemplary schematic illustration of the exemplary conversion device mounted in front of a receiver (and optionally transmitter) of another existing exemplary service providing system and an exemplary client object, according to some embodiments of the present invention.
Figure 2A:
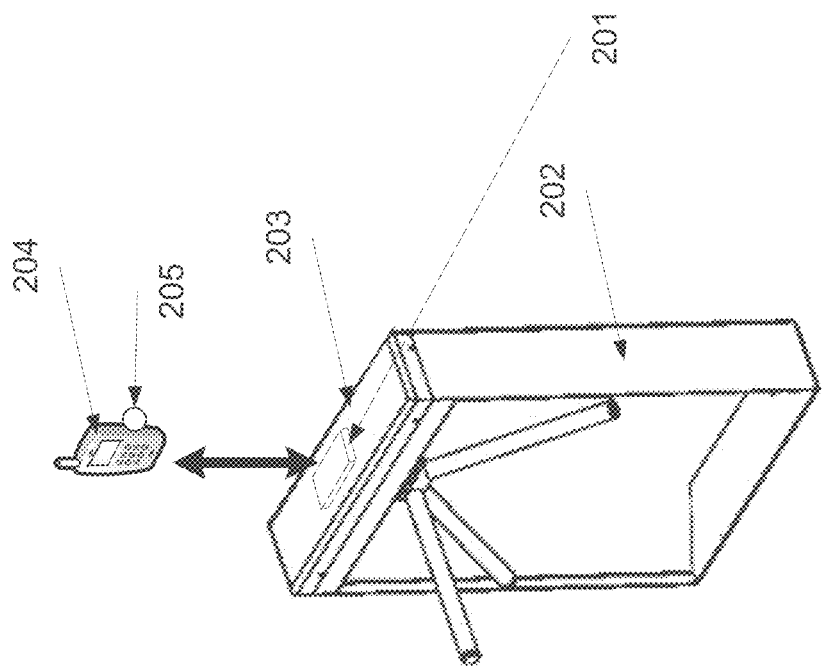
FIG. 2A is an exemplary schematic illustration of an exemplary conversion 201 mounted in front of a receiver (and optionally transmitter) of an existing exemplary service providing system 202 and an exemplary client terminal, a cellular phone, according to some embodiments of the present invention.

Reference is now also made to FIG. 2A, which is an exemplary schematic illustration of an exemplary conversion device 201 mounted in front of a receiver (and optionally transmitter) 203 of an existing exemplary service providing system 202 and an exemplary client terminal 204, a cellular phone, according to some embodiments of the present invention. In this depicted example, the service providing system 202 is a turnstile, such as a subway and/or train ticket turnstile which is set to communicate with RFID tags according to an RFID communication protocol.

Reference is now also made to FIG. 2B, which is an exemplary schematic illustration of the exemplary conversion device 201 mounted in front of a receiver (and optionally transmitter) 303 of another existing exemplary service providing system 302 and an exemplary client object 304, a Bluetooth™ module such as a Bluetooth™ tag and/or a Wi-Fi tag, according to some embodiments of the present invention. In this depicted example, the service providing system 302 is an RFID/NFC card reader used to read RFID/NFC tags, such as a file tags and/or object tags according to an RFID/NFC communication protocol. In such embodiments, the Bluetooth tag can be used together with RFID/NFC tags where the conversion device 201 convert Bluetooth/Wi-Fi messages to RFID/NFC messages and ignores RFID/NFC messages which are read by the service providing system 302. Unique ID of Bluetooth/Wi-Fi tags can be added to a management system. Optionally, the exemplary conversion device 201 is supported by a system, for example a Software as a service (SaaS) system or a software installed in a client, that uploads unique IDs into the memory of Bluetooth/Wi-Fi tags and updates the warehouse management system with the unique IDs. In such a manner, a warehouse operator may expand operative range of used tags by using Bluetooth tags in addition to or instead of existing RFID/NFC tags. The Unique ID of Bluetooth/Wi-Fi tags are added to the warehouse management system. In use, the conversion device 201 detects Bluetooth/Wi-Fi messages and establishes a communication channel with the conversion device 201. After communication establishment, the Bluetooth/Wi-Fi tag sends, according to a Bluetooth/Wi-Fi protocol, the service related content encoded in a Bluetooth/Wi-Fi message. The conversion device 201, for instance using a microcontroller, stores the service related content at a memory area to allow an RFID/NFC module (i.e. circuit) to access the service related content and to transmit the service related content in a message encoded according to an RFID/NFC communication protocol to the service providing system 202, for example in response to interrogator signals which is received by it. Upon the communication establishment, the service related content is passed to the service providing system 202 and the warehouse management system is updated. It should be noted that although Wi-Fi is described herein, any other WLAN protocol may be used.

It should be noted that the exemplary conversion device 201 may be mounted in any location that allows it to communicate with the receiver (and optionally transmitter) 203, 303, for example on a lateral wall of the service providing system 202, 303.

It should be noted that the exemplary conversion device 201 may also be integrated into a service providing system, for example mounted in the housing of the service providing system 202/302 (not shown).

Optionally, the conversion device is powered independently from the service providing system. Additionally or alternatively, the conversion device is not electrically connected to the service providing system. Additionally or alternatively, the conversion device is not wired to the service providing system. Additionally or alternatively, the electronic components of the conversion device and the electronic components of the service providing system are in separate housings.

The methods and conversion devices described hereinbelow allow a user of the client terminal 204, for example a Smartphone, to use the client terminal 204 instead a tag and/or a card, such as an RFID and/or NFC tags and/or cards for communicating with the service providing system 202/302 without having to change the service providing system 202/302 itself. Optionally, the client terminal 204 hosts a client module 205, such as a Google Play™ and/or iTune™ store application. The client module 205instructs the transmission of wireless messages that include service related content and optionally receives messages containing data originated from the service providing system 202/302 and/or indications of such.

Optionally, the client module 205 manages and/or contacts a user interface, for example a graphical user interface (GUI) to allow the user of the client terminal to enroll to a system supporting the conversion device(s) 201 and/or to download, purchase, and/or otherwise update the service related content. For example the GUI may allow purchasing eTicketing codes, charging entry and/or usage balance, and/or the like.

Figure 3:
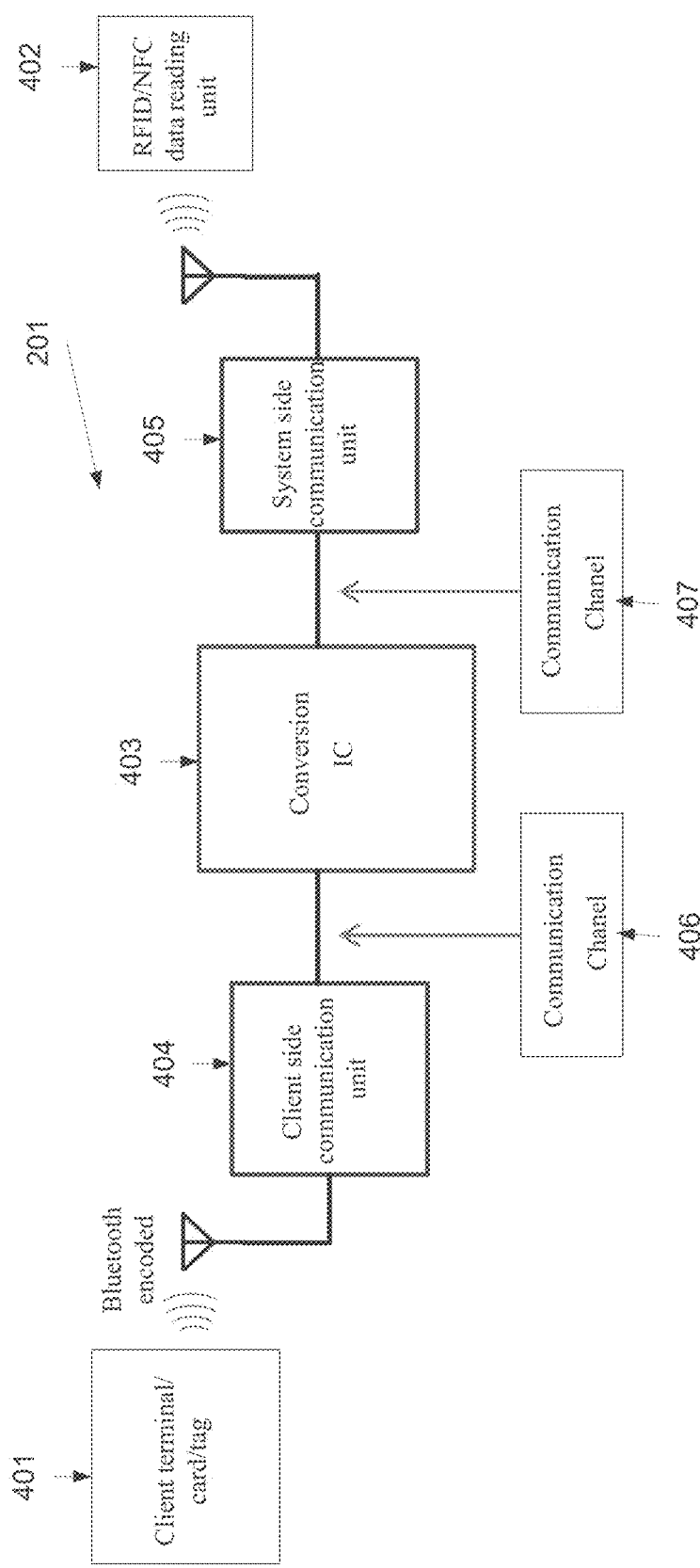
FIG. 3 is a schematic illustration of components of an exemplary conversion device and units which communicate, optionally with one another via the conversion device, according to some according to embodiments of the present invention.

FIG. 3 is a schematic illustration of components of an exemplary conversion device 201 and of units 401, 402 which communicate, optionally with one another via the conversion device 201, according to some according to embodiments of the present invention. The exemplary conversion device 201 includes a client side communication unit 404 for receiving a wireless message in a first communication protocol, for example a Bluetooth and/or Wi-Fi module. The exemplary conversion device 201 includes a conversion integrated circuit (IC) 403, for example a microcontroller, which automatically extracts, for instance automatically after intercepting the wireless message from client terminal and/or card and/or tag 401, service related content encoded in the intercepted wireless message. The conversion integrated circuit (IC) 403 may store the service related content in a memory to allow the encoding thereof in a second wireless message, for example as described below, and/or create a second wireless message by itself. The second wireless message is encoded according to a second communication protocol, for example RFID/NFC communication protocol. The conversion IC 403 instructs a system side communication unit 405 to transmit the second wireless message immediately after intercepting wireless message, for instance by storing the service related content in the memory of the conversion device 201. The system side communication unit may be an RFID/NFC module and/or tag 405. The created wireless message is transmitted by the system side communication unit to a service providing system, such the RFID/NFC data reading unit 402. The conversion IC 403 is optionally wire connected to the system side communication unit 405 and the client side communication unit 404.

Optionally, the system side communication unit 405 includes a receiver receiving signals from the service providing system. For example, the service providing system is set to communicate according to a passive RFID communication protocol. In such an example, the system side communication unit 405 is set to receive interrogator signal(s) from the RFID data reading unit 402 and to transmit, in response to the interrogator signal(s), messages which are read as authentication replies from a passive tag. In another example, the service providing system is set to communicate according to an active reader active tag (ARAT) communication protocol. In such an example, the system side communication unit 405 is set to receive interrogator signal(s) from the RFID data reading unit 402 and to transmit, in response to the interrogator signal(s), messages which are read as return reporting signals from an active tag. In such embodiments, when interrogator signal(s) are intercepted by the system side communication unit 405, the conversion IC generates interrogator signal(s) which are encoded according to the first communication protocol, for example a Bluetooth and /or Wi-Fi messages. Then, the conversion IC 403 instructs the client side communication unit 404, for example a Bluetooth™ module or a Wi-Fi module, to transmit a message that includes an interrogator message extracted from the interrogator signal and/or indicative of receiving interrogator signal. The message, which is optionally encoded according to Bluetooth™ or Wi-Fi protocol, indicates to the client terminal and/or card and/or tag to generate a wireless message encoding service related content, for example as described above.

Reference is now made, once again, to FIG. 1, describing a process wherein service related content is forwarded to a service providing system from a tag, card, or client that is not adapted to communicate therewith. First, as shown at 101, for example as shown at FIGS. 2A and 2B, the conversion device 201, is located in proximity to a service providing system, such as 202, 302. The conversion device 201 may be attached, either in a detachable or in a non detachable manner, in proximity to a receiver of the service providing system. Optionally, the service related content is generated by the client module 205 and transmitted by the client terminal 204. For example, service related content is data emulating a response signal data that is based on records stored in a memory of and/or a memory accessible to an RFID tag and/or an electronic ticket, for instance keys encoded in the memory of the RFID tag.

Optionally, the application manages a wireless communication with the client side communication unit 404. The wireless communication channel may be in a broadcast mode and/or a peer to peer (P2P) mode.

Now, as shown at 102, the conversion device 201, for example using the client side communication unit 404, intercepts a first wireless message having service related content encoded according to a first communication protocol. The first wireless message may be intercepted after interrogator signals have awoken a transmitting element, for example as described above and/or transmitted upon request and/or iteratively.

Then, as shown at 103, the service related content is extracted from the first wireless message, for example using the conversion IC 403. The extracted service related content may be stored in a memory that is accessible to a system side communication unit. Now, as shown at 104, a second wireless message having the service related content encoded therein is generated according to a second communication protocol by the conversion device 201.

For example, in 103, the conversion IC 403, for example a microcontroller, stores the service related content at a common storage area, facilitating access thereto by the system side communication unit 404, which may be, for example an RFID circuit and/or NFC circuit. In 104, access is performed via communication channel 407. In such embodiments, upon the communication establishment, stored data is passed by the system side communication unit 404 to the service providing system 402.

In another example, the conversion IC 403 extracts service related content encoded in the intercepted wireless message and decodes the service related content in a new wireless message transmitted by the system side communication unit 405 to the service providing system.

The above induces the system side communication unit 405, as shown at 105, to transmit the generated second wireless message to the service providing system 202, 302.

Figure 4:
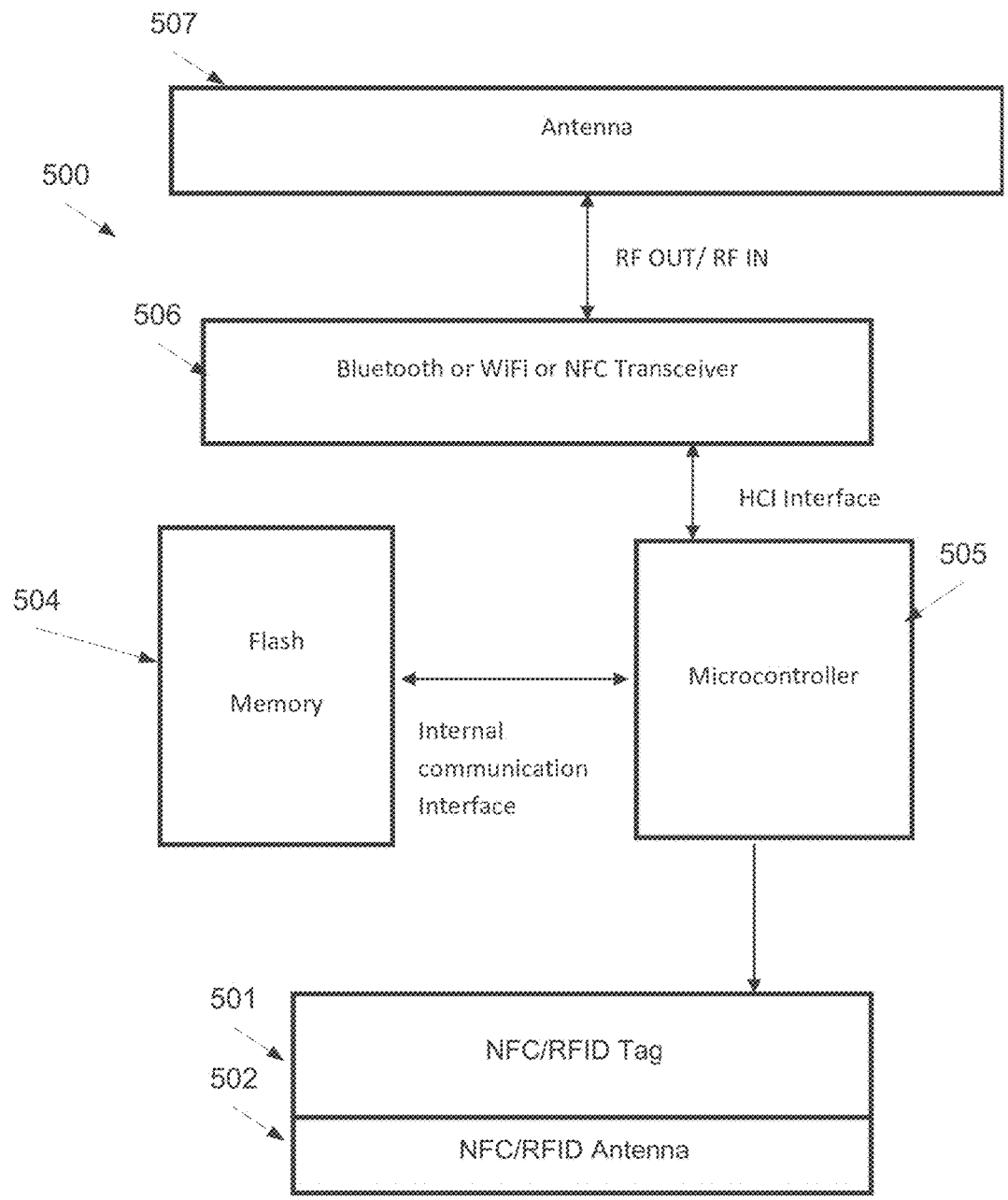
FIG. 4 is a schematic illustration that depicts a plurality of components of an exemplary conversion device, according to some according to embodiments of the present invention.

Reference is now made to FIG. 4, which is a schematic illustration that depicts a plurality of components of an exemplary conversion device 500 that is set to convert Bluetooth, Wi-Fi, signals and to generate from the service related content encoded therein an RFID and/or NFC signal using an RFID and/or NFC tag 501 with and RFID and/or NFC antenna 502, for instance as described above. The exemplary conversion device 500 includes a flash memory 504 for storing the service related content and a microcontroller 505. Bluetooth, Wi-Fi, and/or NFC signals are intercepted using a suitable IC 506 and an antenna 507.

Figure 5:
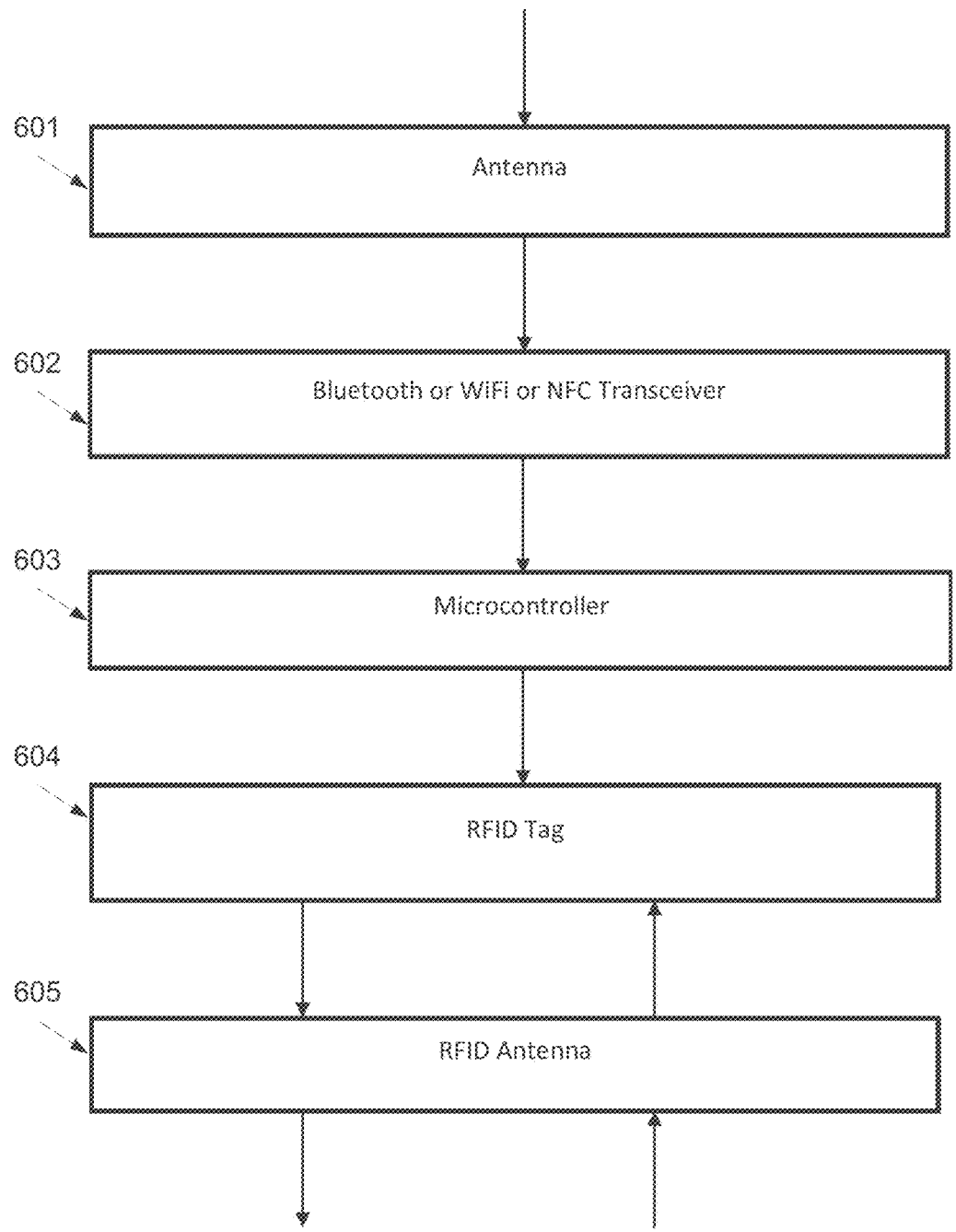
FIG. 5 depicts a flow of events held by the components of the exemplary conversion device, according to some embodiments of the present invention.

FIG. 5 depicts a flow of events held by the components of the exemplary conversion device 500, according to some embodiments of the present invention.

First, as shown at 601, Bluetooth and/or Wi-Fi and/or NFC transmission reaches the input Antenna 507.

Then, as shown at 602, the received transmission is routed to the Bluetooth and/or Wi-Fi and/or NFC transceiver 506. The transceiver 506 encrypts the service related content from the transmission, preparing a digital format packet that is forwarded to the microcontroller 505. Now, as shown at 603, the microcontroller is informed that the digital format packet is ready, reads the digital format packet data, analyzes the digital format packet, and prepares a message package with the required data in an RFID compliant format. This message package is forwarded to the 504 which is a memory that is reachable from the RFID Tag 404.

Now, as shown at 604, when the RFID tag detects (routed from the RFID antenna 405, 605) interrogator signals originated from an RFID reader of a service providing system, the RFID tag responds via the RFID antenna 405 with the service related content stored in memory 504. As shown at 605, the response is transmitted by the RFID Antenna, back to the RFID reader, which receives and handles the response.

It should be noted that although, in the above example, reference is made to RFID reader, RFID antenna, and RFID Tag, the same may apply to NFC reader, NFC antenna, and NFC Tag.

Upon the communication establishment and optionally validation of the service related content, the service providing system perform an action induced by the reception of the service related content. For example, the service providing system provides a service such as performing a payment, a cash withdrawal, a public transportation ticketing event, and/or the like. In another example, the service providing system performs an operation such as registering the service related content in a management system and/or an operation on behalf of an entity associated with the service related content. In such a manner, the client terminal and/or card and/or tag 401 may be used to activate, operate, transmit content, receive content, and/or otherwise communicate with the service providing system even though the service providing system is not designed or apt to be activate, be operated, transmit service related content to, receive data from and/or otherwise communicate with the client terminal and/or card and/or tag 401.

The methods as described above are used in the fabrication of integrated circuit chips.

The flowchart and block diagrams in the Figures illustrate the architecture, functionality, and operation of possible implementations of systems, methods and computer program products according to various embodiments of the present invention.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a unit, a component, a device, and a message is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of wireless forwarding of service related content in a communication session, comprising:
   providing a conversion circuit fixated in proximity to a service providing system and having a client side communication unit and a system side communication unit;
   intercepting, using said client side communication unit, a first wireless data message having service related content encoded according to a first communication protocol;
   receiving an interrogator signal from said service providing system at said system side communication unit;
   generating, using said system side communication unit, a second wireless data message having said service related content encoded according to a second communication protocol; and
   transmitting, using said system side communication unit, said second wireless data message to said service providing system,
   wherein said generating and said transmitting are performed in response to said interrogator signal.

2. The method of claim 1, wherein said first wireless data message is originated from a handheld client terminal.

3. The method of claim 1, wherein said service providing system operates an electric gate according to said service related content.

4. The method of claim 1, wherein said system side communication unit comprises at least one of a near field communication (NFC) tag and a radio frequency identification (RFID) tag which performs said generating and said transmitting.

5. The method of claim 4, wherein said intercepting comprises:
   decoding said service related content encoded from said first wireless data message, and storing said decoded service related content in a memory of said conversion circuit;
   wherein said generating comprises:
   using said system side communication unit to access said memory; and
   using said system side communication unit to encode said decoded service related content according to said second communication protocol.

6. The method of claim 1, wherein said service related content comprises a member of a group consisting of a unique identification (ID), an account number, a secret code, a credit balance, and electronic ticketing data.

7. The method of claim 1, wherein said first communication protocol is Bluetooth™ protocol and said second communication protocol is near field communication (NFC) protocol.

8. The method of claim 1, wherein said first communication protocol is Bluetooth™ protocol and said second communication protocol is radio frequency identification (RFID) protocol.

9. A method of wireless forwarding of service related content in a communication session, comprising:
   providing a conversion circuit fixated in proximity to a service providing system and having a client side communication unit and a system side communication unit;
   intercepting, using said client side communication unit, a first wireless data message having service related content encoded according to a first communication protocol;
   generating, using said system side communication unit, a second wireless data message having said service related content encoded according to a second communication protocol; and
   transmitting, using said system side communication unit, said second wireless data message to said service providing system;
   wherein said first communication protocol is wireless local area network (WLAN) protocol and said second communication protocol is selected from a group consisting of radio frequency identification (RFID) protocol and near field communication (NFC) protocol;
   wherein said system side communication unit is at least one of a near field communication (NFC) tag and an radio frequency identification (RFID) tag; further comprising deactivating at least one of said NFC tag and said RFID tag; wherein said transmitting comprises injecting said service related content to a memory of said RFID tag and initializing said RFID tag to allow a wireless activation thereof by an RFID reader of said service providing system; wherein said transmitting is performed in response to said activation.

10. A conversion system of wireless forwarding of service related content in a communication session, comprising:
    a housing having a holding element for fixation in proximity to a service providing system;
    a client side communication unit which intercepts a first wireless data message having service related content encoded according to a first communication protocol;
    a system side communication unit which receives an interrogator signal from said service providing system; and
    a conversion integrated circuit (IC) which—automatically generates, in response to intercepting to said interrogator signal and said first wireless data message, a second wireless data message having said service related content encoded according to a second communication protocol and instructs said system side communication unit to transmit said second wireless data message immediately after receiving said first wireless data message and in response to said interrogator signal.

11. The conversion system of claim 10, wherein said conversion IC, said client side communication unit, and system side communication unit are powered independently from said service providing system.

12. The conversion system of claim 10, wherein said conversion IC, said client side communication unit, and system side communication unit are not electrically connected to said service providing system.

13. The conversion system of claim 10, wherein said conversion IC, said client side communication unit, and system side communication unit are not wired to said service providing system.

14. The conversion system of claim 10, wherein said housing is external to said service providing system.

15. The conversion system of claim 10, wherein said client side communication unit is a Bluetooth™ hardware module and said first communication protocol is Bluetooth™ protocol.

16. The conversion system of claim 10, wherein said client side communication unit is a wireless local area network (WLAN) hardware module and said first communication protocol is a wireless local area network (WLAN) protocol.

17. The conversion system of claim 10, wherein said housing mounts said transmitter to face a service providing system client side communication unit of a service providing system.

18. The conversion system of claim 10, wherein said system side communication unit is at least one of a near field communication (NFC) tag and an radio frequency identification (RFID) tag; wherein said conversion integrated circuit automatically injects said service related content to a memory of at least one of said NFC tag and said RFID tag and initializes said RFID tag to allow a wireless activation thereof by at least one of an NFC reader and an RFID reader of said service providing system.

19. The conversion system of claim 10, wherein housing having an upper panel and a lower panel which confines said client side communication unit, said conversion IC, and said system side communication unit and sized and shaped to cover a card reading area of said service providing system.

20. The conversion system of claim 10, further comprising a software client module installed in a handheld client terminal which adds said service related content to said first wireless data message; wherein said service related content is coordinated with an external management system.

21. The conversion system of claim 11, wherein said service related content is a unique identifier (ID) indicative of entry card.

* * * * *